United States Patent
Cherubini et al.

(10) Patent No.: US 9,524,741 B1
(45) Date of Patent: Dec. 20, 2016

(54) HIGH-DENSITY PATTERN DETECTOR FOR HYBRID SERVO PATTERNS

(71) Applicant: International Business Machines Corporation, Armonk, NY (US)

(72) Inventors: Giovanni Cherubini, Rueschlikon (CH); Simeon Furrer, Altdorf (CH); Robert A. Hutchins, Tucson, AZ (US); Jens Jelitto, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/929,227

(22) Filed: Oct. 30, 2015

(51) Int. Cl.
- G11B 5/584 (2006.01)
- G11B 5/008 (2006.01)
- G11B 5/09 (2006.01)
- G11B 20/10 (2006.01)
- G11B 20/18 (2006.01)

(52) U.S. Cl.
CPC .......... G11B 5/584 (2013.01); G11B 5/00813 (2013.01); G11B 5/09 (2013.01); G11B 20/10046 (2013.01); G11B 20/18 (2013.01)

(58) Field of Classification Search
None
See application file for complete search history.

(56) References Cited

U.S. PATENT DOCUMENTS

| | | | |
|---|---|---|---|
| 6,831,806 B2 * | 12/2004 | Chliwnyj | G11B 5/584 360/77.12 |
| 6,873,487 B2 | 3/2005 | Molstad | |
| 6,940,683 B2 * | 9/2005 | Berman | G11B 5/584 360/77.12 |
| 6,943,979 B2 * | 9/2005 | Goker | G11B 5/584 360/77.12 |
| 7,110,212 B2 * | 9/2006 | Bui | G11B 15/688 360/77.12 |
| 7,393,066 B2 | 7/2008 | Dugas et al. | |
| 7,411,759 B2 | 8/2008 | Trabert et al. | |
| 7,742,254 B2 | 6/2010 | Cherubini et al. | |

(Continued)

FOREIGN PATENT DOCUMENTS

EP 923078 A1 6/1999

OTHER PUBLICATIONS

Lantz et al., "Servo-Pattern Design and Track-Following Control for Nanometer Head Positioning on Flexible Tape Media," IEEE Transactions on Control Systems Technology, vol. 20, No. 2, Mar. 2012, pp. 369-381.

*Primary Examiner* — K. Wong
(74) *Attorney, Agent, or Firm* — Zilka-Kotab, PC

(57) ABSTRACT

In one embodiment, a tape drive includes a controller including a processor and logic integrated with and/or executable by the processor. The logic is configured to obtain at least two periodic waveform components of a high density (HD) servo signal read by a servo reader from a HD pattern written on a servo band of a magnetic tape medium. The logic is also configured to filter the HD servo signal using a number of digital filters that are configurable to detect waveform components simultaneously read from the magnetic tape medium, each digital filter being configured to match waveform component parameters and tape velocity. Moreover, the logic is configured to compute a position error signal (PES) based on the filtering of the HD servo signal comprising the waveform components.

25 Claims, 9 Drawing Sheets

(56) References Cited

U.S. PATENT DOCUMENTS

| | | | | |
|---|---|---|---|---|
| 8,576,510 B2 * | 11/2013 | Cherubini | ............ | G11B 5/584 |
| | | | | 360/77.12 |
| 9,058,828 B1 * | 6/2015 | Cherubini | ............ | G11B 5/584 |
| 2004/0265635 A1 | 12/2004 | Ishiguro | | |
| 2011/0228421 A1 | 9/2011 | Watanabe | | |

* cited by examiner

Periodic Waveform at High Frequency $f_2$

Periodic Waveform at Low Frequency $f_1$

HIGH-DENSITY PATTERN DETECTOR FOR HYBRID SERVO PATTERNS

BACKGROUND

The present invention relates to tape storage systems, and more specifically, to a high density pattern detector for use with tapes having hybrid servo patterns.

Timing-based servo (TBS) is a technology developed specifically for linear tape drives in the late 1990s. In TBS systems, recorded servo patterns include transitions with two different azimuthal slopes. An estimate of the head lateral position is derived from the relative timing of pulses generated by a servo reader reading the pattern.

In a TBS format, the servo pattern is prerecorded in several bands distributed across the tape, typically five or nine bands. Data is recorded in the regions located between pairs of servo bands. FIG. 3 illustrates the tape layout for five servo bands and four data bands, as specified in the linear tape-open (LTO) format and IBM Enterprise format. In read/write heads of IBM LTO and Enterprise tape drives, two servo readers are normally available per head module, from which longitudinal position (LPOS) information as well as a position error signal (PES) may be derived. Optimum detection of the TBS patterns is achieved by a synchronous servo channel employing a matched-filter interpolator/correlator, which ensures optimum filtering of the servo reader signal.

With the increase in track density that is envisioned for future tape media and tape drives, controlling the lateral position of the head and its skew with respect to tape by using feedback generated by reading the TBS patterns might not be sufficiently accurate to ensure adequate positioning accuracy of the data readers and writers that move along data tracks. Furthermore, the repetition rate of the head lateral position estimates might be too small to guarantee proper track-following operation at very low tape velocity, or to support future actuators with large bandwidths.

SUMMARY

In one embodiment, a tape drive includes a controller including a processor and logic integrated with and/or executable by the processor. The logic is configured to obtain at least two periodic waveform components of a high density (HD) servo signal read by a servo reader from a HD pattern written on a servo band of a magnetic tape medium. The logic is also configured to filter the HD servo signal using a number of digital filters that are configurable to detect waveform components simultaneously read from the magnetic tape medium, each digital filter being configured to match waveform component parameters and tape velocity. Moreover, the logic is configured to compute a position error signal (PES) based on the filtering of the HD servo signal comprising the waveform components.

In another embodiment, a method includes reading a hybrid servo pattern from a magnetic tape medium using at least one servo reader of a tape drive to produce a servo signal, the hybrid servo pattern comprising a TBS pattern and a HD pattern. The method also includes obtaining two or more periodic waveform components of the servo signal from the at least one servo reader, each of the periodic waveform components being characterized by a different frequency: a low frequency ($f_1$), a mid frequency ($f_2$), and a high frequency ($f_3$), with $f_1<f_2<f_3$. In addition, the method includes filtering the servo signal using a number of digital filters equal to or greater than a number of periodic waveform components simultaneously read from the magnetic tape medium, each digital filter being configurable to match a frequency of a particular periodic waveform component and a tape velocity. The method also includes computing a PES based on the filtering of the servo signal comprising the periodic waveform components.

In yet another embodiment, a system includes a processor and logic integrated with and/or executable by the processor. The logic is configured to cause the processor to read a hybrid servo pattern from at least one dedicated area of a magnetic tape medium to obtain a servo signal. The logic is also configured to cause the processor to filter the servo signal using a number of digital filters equal to or greater than a number of periodic waveform components simultaneously read from the magnetic tape medium, each digital filter being configurable to match a frequency of a particular periodic waveform component and a tape velocity. The hybrid servo pattern includes a TBS pattern and a HD pattern positioned at a predefined distance from the TBS pattern. The HD pattern includes periodic waveforms written in at least three adjacent positions along a longitudinal direction of magnetic tape medium travel, each of the periodic waveforms being written with a different frequency.

According to another embodiment, a tape drive includes a controller having a processor and logic integrated with and/or executable by the processor. The logic is configured to obtain at least three periodic waveform components of a HD servo signal read by a servo reader from a HD pattern written on a servo band of a magnetic tape medium. The logic is also configured to filter the HD servo signal using a number of digital filters to detect the at least three waveform components read from the magnetic tape medium, each digital filter being configured to match tape velocity and waveform component parameters of a single waveform component. The number of digital filters is equal to or greater than a number of waveform components read from the magnetic tape medium. Additionally, the logic is configured to compute a PES based on the filtering of the HD servo signal comprising the waveform components.

In accordance with another embodiment, a computer program product includes a computer readable storage medium having program instructions embodied therewith. The computer readable storage medium is not a transitory signal per se, and the program instructions readable by a tape drive to cause the tape drive to perform a method. The method includes reading, by the tape drive, a hybrid servo pattern from a magnetic tape medium using at least one servo reader of the tape drive to produce a servo signal, the hybrid servo pattern comprising a timing based servo (TBS) pattern and a high density (HD) pattern. The method also includes obtaining, by the tape drive, two or more periodic waveform components of the servo signal from the at least one servo reader, each of the periodic waveform components being characterized by a different frequency: a low frequency ($f_1$), a mid frequency ($f_2$), and a high frequency ($f_3$), with $f_1<f_2<f_3$. Also, the method includes filtering, by the tape drive, the servo signal using a number of digital filters equal to or greater than a number of periodic waveform components simultaneously read from the magnetic tape medium, each digital filter being characterized by a frequency of a particular periodic waveform component and a tape velocity. Moreover, the method includes computing, by the tape drive, a PES based on the filtering of the servo signal comprising the periodic waveform components.

Other aspects and embodiments of the present invention will become apparent from the following detailed description, which, when taken in conjunction with the drawings, illustrate by way of example the principles of the invention.

DETAILED DESCRIPTION

Figure 1:
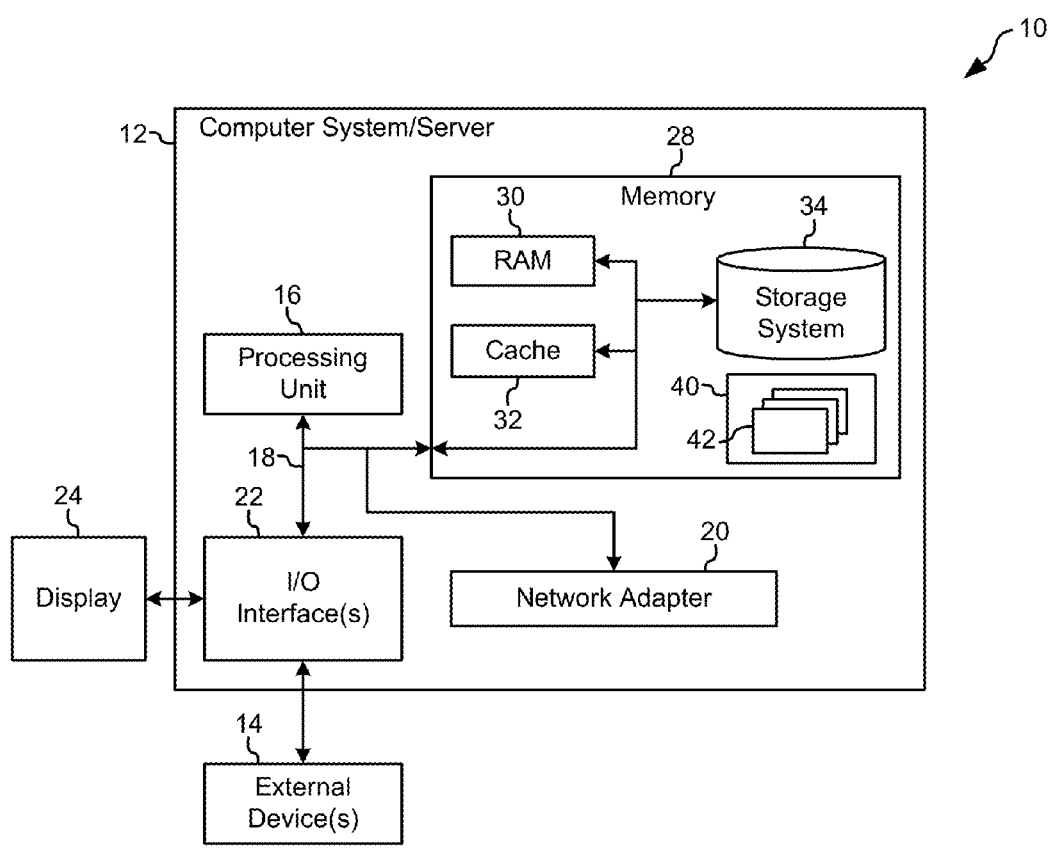
FIG. 1 illustrates a network storage system, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "about" as used herein indicates the value preceded by the term "about," along with any values reasonably close to the value preceded by the term "about," as would be understood by one of skill in the art. When not indicated otherwise, the term "about" denotes the value preceded by the term "about"±10% of the value. For example, "about 10" indicates all values from and including 9.0 to 11.0.

The following description discloses several preferred embodiments of systems, methods, and computer program products for detecting high density servo patterns from magnetic tape.

In one general embodiment, a tape drive includes a controller including a processor and logic integrated with and/or executable by the processor. The logic is configured to obtain at least two periodic waveform components of a high density (HD) servo signal read by a servo reader from a HD pattern written on a servo band of a magnetic tape medium. The logic is also configured to filter the HD servo signal using a number of digital filters that are configurable to detect waveform components simultaneously read from the magnetic tape medium, each digital filter being configured to match waveform component parameters and tape velocity. Moreover, the logic is configured to compute a position error signal (PES) based on the filtering of the HD servo signal comprising the waveform components.

In another general embodiment, a method includes reading a hybrid servo pattern from a magnetic tape medium using at least one servo reader of a tape drive to produce a servo signal, the hybrid servo pattern comprising a TBS pattern and a HD pattern. The method also includes obtaining two or more periodic waveform components of the servo signal from the at least one servo reader, each of the periodic waveform components being characterized by a different frequency: a low frequency ($f_1$), a mid frequency ($f_2$), and a high frequency ($f_3$), with $f_1 < f_2 < f_3$. In addition, the method includes filtering the servo signal using a number of digital filters equal to or greater than a number of periodic waveform components simultaneously read from the magnetic tape medium, each digital filter being configurable to match a frequency of a particular periodic waveform component and a tape velocity. The method also includes computing a PES based on the filtering of the servo signal comprising the periodic waveform components.

In yet another general embodiment, a system includes a processor and logic integrated with and/or executable by the processor. The logic is configured to cause the processor to read a hybrid servo pattern from at least one dedicated area of a magnetic tape medium to obtain a servo signal. The logic is also configured to cause the processor to filter the servo signal using a number of digital filters equal to or greater than a number of periodic waveform components simultaneously read from the magnetic tape medium, each digital filter being configurable to match a frequency of a particular periodic waveform component and a tape velocity. The hybrid servo pattern includes a TBS pattern and a HD pattern positioned at a predefined distance from the TBS pattern. The HD pattern includes periodic waveforms written in at least three adjacent positions along a longitudinal direction of magnetic tape medium travel, each of the periodic waveforms being written with a different frequency.

According to another general embodiment, a tape drive includes a controller having a processor and logic integrated with and/or executable by the processor. The logic is configured to obtain at least three periodic waveform components of a HD servo signal read by a servo reader from a HD pattern written on a servo band of a magnetic tape medium. The logic is also configured to filter the HD servo signal using a number of digital filters to detect the at least three waveform components read from the magnetic tape medium, each digital filter being configured to match tape velocity and waveform component parameters of a single waveform component. The number of digital filters is equal to or greater than a number of waveform components read from the magnetic tape medium. Additionally, the logic is configured to compute a PES based on the filtering of the HD servo signal comprising the waveform components.

In accordance with another general embodiment, a computer program product includes a computer readable storage medium having program instructions embodied therewith. The computer readable storage medium is not a transitory signal per se, and the program instructions readable by a tape drive to cause the tape drive to perform a method. The method includes reading, by the tape drive, a hybrid servo pattern from a magnetic tape medium using at least one servo reader of the tape drive to produce a servo signal, the hybrid servo pattern comprising a timing based servo (TBS) pattern and a high density (HD) pattern. The method also includes obtaining, by the tape drive, two or more periodic waveform components of the servo signal from the at least one servo reader, each of the periodic waveform components being characterized by a different frequency: a low frequency ($f_1$), a mid frequency ($f_2$), and a high frequency ($f_3$), with $f_1 < f_2 < f_3$. Also, the method includes filtering, by the tape drive, the servo signal using a number of digital filters equal to or greater than a number of periodic waveform components simultaneously read from the magnetic tape medium, each digital filter being characterized by a frequency of a particular periodic waveform component and a tape velocity. Moreover, the method includes computing, by the tape drive, a PES based on the filtering of the servo signal comprising the periodic waveform components.

Referring now to FIG. 1, a schematic of a network storage system 10 is shown according to one embodiment. This network storage system 10 is only one example of a suitable storage system and is not intended to suggest any limitation as to the scope of use or functionality of embodiments of the invention described herein. Regardless, network storage system 10 is capable of being implemented and/or performing any of the functionality set forth hereinabove.

In the network storage system 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in the network storage system 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 may include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 may be provided for reading from and writing to a non-removable, non-volatile magnetic media—not shown and typically called a "hard disk," which may be operated in a HDD. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each may be connected to bus 18 by one or more data media interfaces. As will be further depicted and described below, memory 28 may include at least one program product having a set (e.g., at least one) of program modules that are configured to carry out the functions of embodiments described herein.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication may occur via Input/Output (I/O) interfaces 22. Still yet, computer system/server 12 may communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, redundant array of independent disks (RAID) systems, tape drives, and data archival storage systems, etc.

Figure 2:
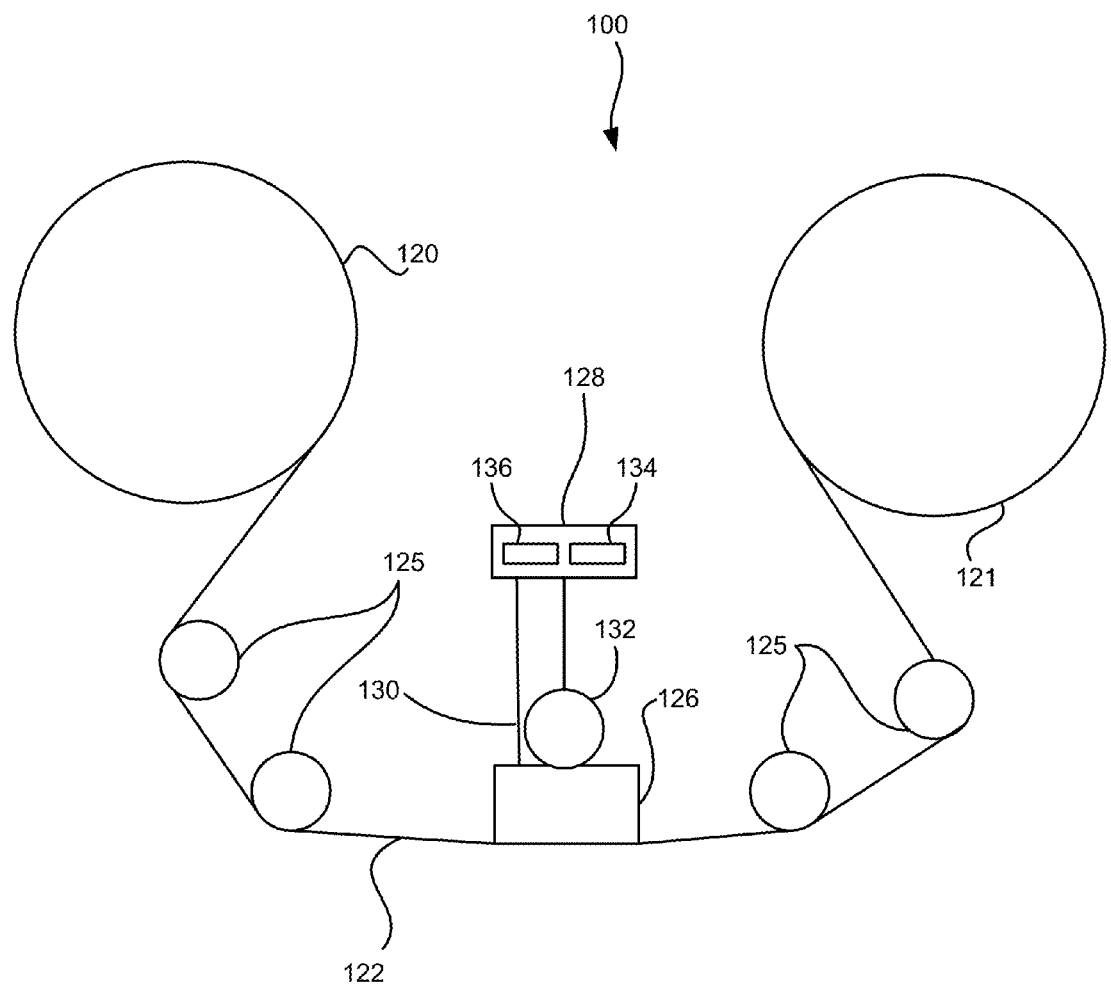
FIG. 2 illustrates a simplified tape drive of a tape-based data storage system, according to one embodiment.
Figure 3:
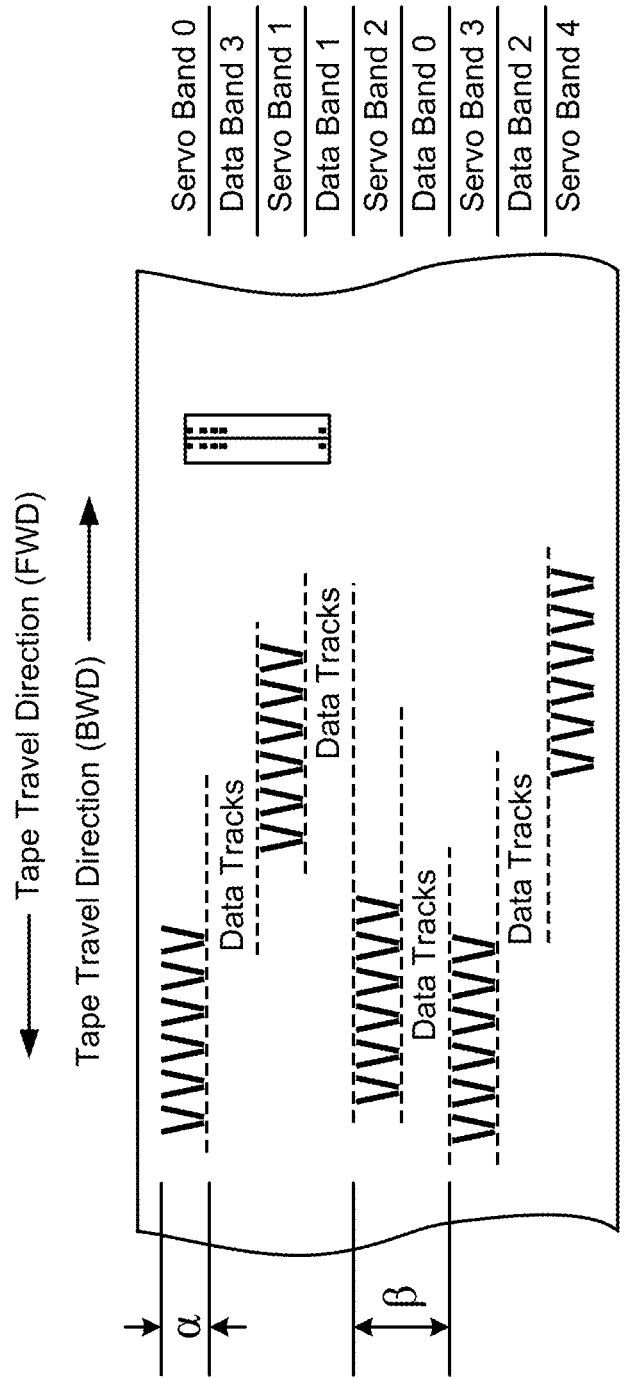
FIG. 3 illustrates a tape layout in accordance with the prior art.

As shown, a tape supply cartridge 120 and a take-up reel 121 are provided to support a tape 122. One or more of the reels may form part of a removable cartridge and are not necessarily part of the tape drive 100. The tape drive, such as that illustrated in FIG. 2, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may include at least one servo channel and at least one data channel, each of which include data flow processing logic configured to process and/or store information to be written to and/or read from the tape 122. The controller 128 may operate under logic known in the art, as well as any logic disclosed herein, and thus may be considered as a processor for any of the descriptions of tape drives included herein, in various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Some tape drives are configured to operate at very low tape velocities and/or with nanometer head position requirements. These tape drives use servo formats that target Barium Ferrite (BaFe) tape media, 4 or 8 data bands, 32 or 64 data channel operation, allow very low velocity operation, support large-bandwidth actuator operation, and improve parameter estimation to minimize standard deviation of the position error signal (PES), thus enabling track-density scaling for tape cartridge capacities up to 100 TB and beyond.

For initial acquisition and positioning as well as servo channel investment protection purposes, the legacy timing-based servo (TBS) pattern (or at least substantial features of the legacy TBS pattern) is included in the servo format, and augmented with additional features that address the requirements described above. One solution is a hybrid servo pattern scheme, in which a legacy TBS pattern is retained and an additional high-density pattern is provided in a dedicated, preferably currently unused area of the tape media. This type of pattern may be implemented by increasing the number of data channels from 16 to 32, and reducing the width of the TBS pattern from 186 microns to 93 microns, in one embodiment.

Figure 4:
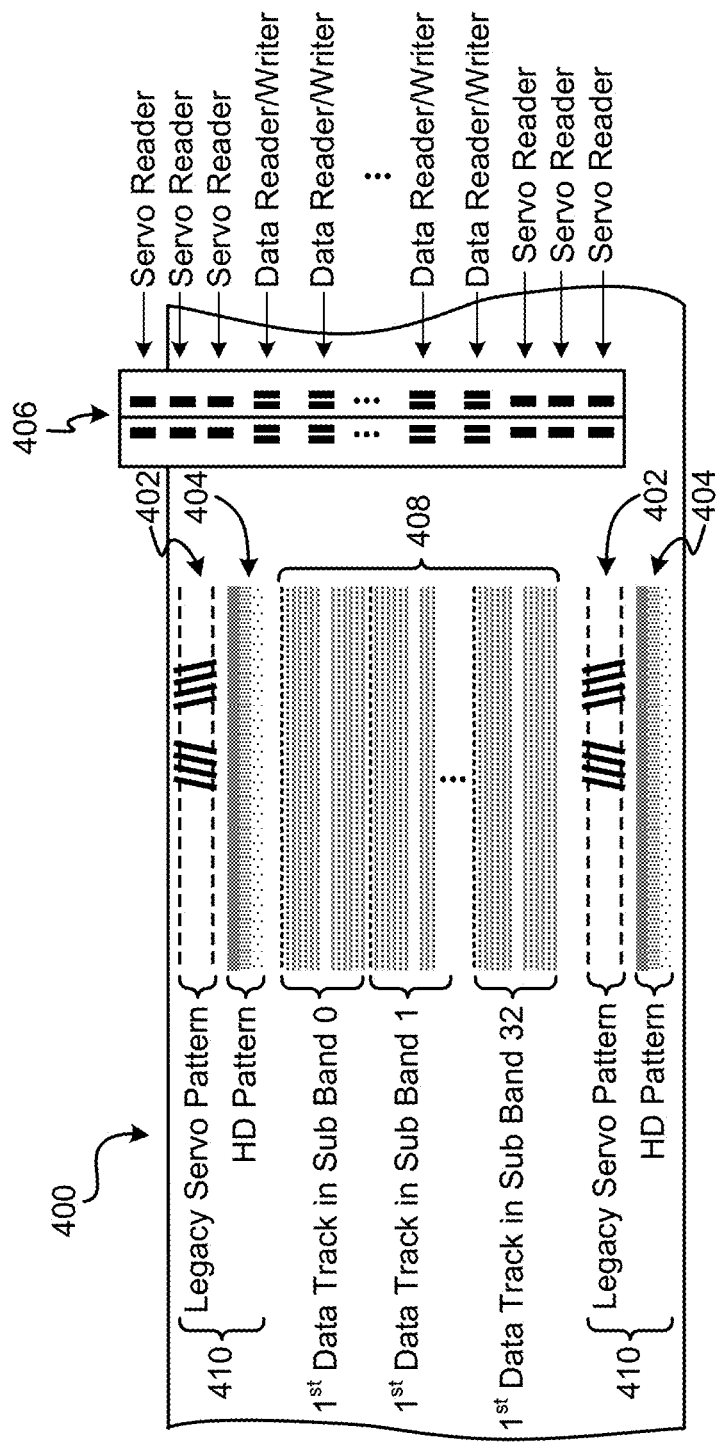
FIG. 4 shows a hybrid servo pattern written in a dedicated area of a tape medium, according to one embodiment.

A hybrid servo pattern 410, which includes a legacy TBS pattern 402 and an additional high-density (HD) pattern 404 that is written in a dedicated area of the tape medium 408 is shown in FIG. 4. As shown in FIG. 4, significant features of the original TBS pattern 402 are retained, such as a servo frame structure consisting of four servo bursts containing a number of servo stripes, where the servo stripes of adjacent servo bursts are written with alternating azimuthal angle. Other parameters of legacy servo patterns, such as the servo pattern height and other geometric dimensions, as well as the number of servo stripes per burst, may be modified as desired.

The HD pattern 404 may include periodic waveforms of various frequencies alternately written in a longitudinal direction. The legacy TBS pattern 402 enables initial identification of the servo band (providing a servo band ID), initial positioning of the head 406 on an appropriate servo location, and acquisition of initial servo channel parameters, such as tape velocity, lateral head position, head-to-tape skew, longitudinal tape position (LPOS), etc. The HD pattern 404 is designed to enable more accurate and more frequent estimates of servo channel parameters, thereby enabling improved head positioning at a much wider range of tape velocities and support for larger bandwidth head actuation. In this way, track-density scaling is enabled for very large cartridge capacities, as well as improved data rate scaling with host computer requirements through the support of a wider velocity range.

Because the detection of the periodic waveforms forming a high-density pattern is obtained by a detector that implements a complex algorithmic conversion, such as a Discrete Fourier Transform (DFT), a Fast Fourier Transform (FFT), etc., implementation complexity is increased and flexibility in choosing trade-offs between the rate of generation of servo reader lateral position estimates and the standard deviation of the estimation error is limited.

In one embodiment, in order to overcome the drawbacks of current detector implementations, a detector for hybrid TBS and HD patterns is presented that is configured to obtain estimates of the energy of relevant spectral frequency components in a readback signal from the HD pattern, and calculate estimates of the lateral position of the head based on these energies, without resorting to a DFT or a FFT.

Samples taken at the input of the components performing the spectral estimation may be obtained at the proper sampling instants by interpolating the sequence of readback HD servo signal samples from an analog-to-digital (A/D) converter at a fixed clock frequency in one embodiment, or at a variable clock frequency in another embodiment. The time base of the interpolator may be derived from the estimate of the tape velocity provided by the TBS channel operating in parallel with the HD detector, in one embodiment. Of course, any other component configured to determine a tape velocity may provide the estimate of the tape velocity in other embodiments.

Various trade-offs between the rate of generation of spectral estimates, from which servo reader lateral position estimates are obtained, and the standard deviation of the estimation error are possible. However, a suitable and preferred implementation may be achieved with a significantly reduced complexity compared to DFT-based or FFT-based implementations. Specifically, in one embodiment, only a small set of spectral estimates are computed, compared to the fixed set of equally-spaced spectral components computed by a DFT or FFT. Furthermore, the integration interval may be freely adjusted, while a DFT/FFT-based solution requires the integration interval to be multiples of the DFT/FFT size.

Even when the HD servo pattern uses a large number of tone frequencies, the maximum number of spectral estimates that are computed by the proposed detector corresponds to the maximum number of tracks that an HD servo reader reads simultaneously at any time, which is necessarily limited in tape drives. Also, the proposed detector may be reconfigured to provide spectral estimates corresponding to the tracks currently being read based on the coarse positioning information from the TBS channel.

Referring again to FIG. 4, which shows a tape layout 400 with a hybrid servo pattern 410 according to one embodiment, in the hybrid servo pattern 410, an HD pattern 404 is written in a space adjacent to a legacy TBS pattern 402. Note that there is no need for quadrature sequences, as those implemented in, for example, servoing for hard-disk drives, because of the use of the TBS pattern 402.

Figure 5A:
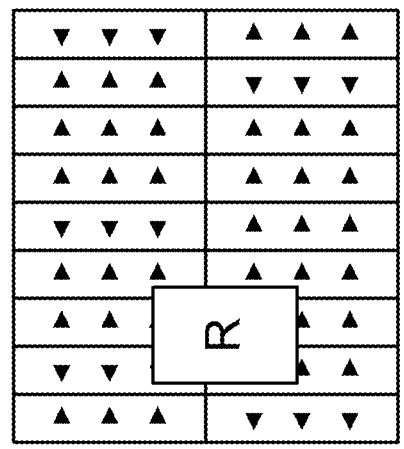
FIG. 5A shows a high density (HD) pattern, according to the prior art.
Figure 5A:
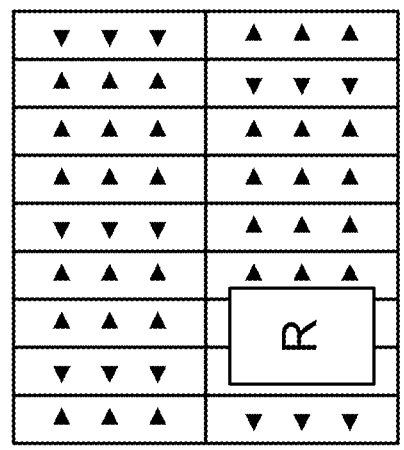

In one embodiment, the HD pattern 404 may include periodic waveforms written on adjacent tracks. For example, two periodic waveforms, characterized by two different spatial frequencies: low-frequency $f_1$ and high-frequency $f_2$, with $f_2 > f_1$, are depicted in FIG. 5A according to the prior art.

In accordance with one embodiment, each waveform is characterized as having a number of periods in a range from about 25 to about 200, such as 30 periods, 50 periods, 75 periods, 100 periods, etc., within a predetermined spacing. In this embodiment, the predetermined spacing may be in a range from about 50 µm to about 150 µm, such as about 60 µm, about 75 µm, about 100 µm, etc. Moreover, the symbol length (L), which represents the fundamental period of the waveform, may be in a range from about 0.5 µm to about 3.0 µm, such as about 1.0 µm, about 1.5 µm, about 2.0 µm, etc.

In one embodiment, the low-frequency waveform may have 50 periods within 76 µm (corresponding to a subframe servo length in one particular TBS pattern). In this embodiment, the symbol length (L1) may be about 1.52 µm.

The high-frequency waveform may exhibit about twice the frequency described above, e.g., 100 periods within 76 µm, with a symbol length (L2) of about 0.76 µm, according to one embodiment.

Note that FIG. 5A implicitly indicates that a limited range of lateral head displacement is achievable, as the reader width is smaller than the track width, indicated by the block labelled R. If a wider range of lateral head displacement is desired, a different configuration of the HD patterns may be used to avoid ambiguity in determining the lateral displacement.

Figure 5B:
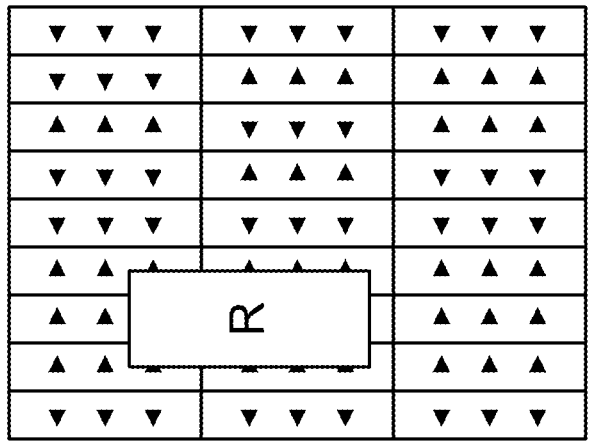
FIG. 5B shows a HD pattern, according to one embodiment.
Figure 5B:
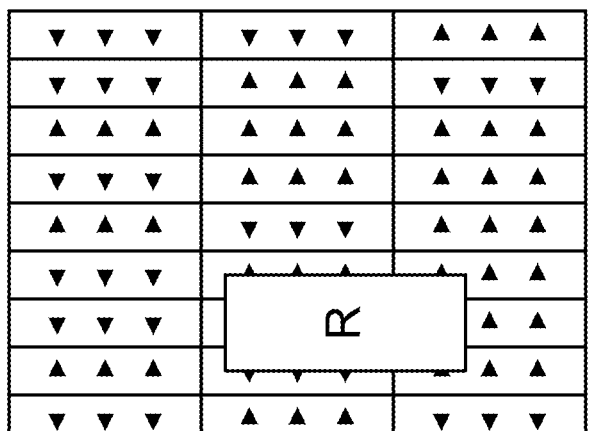

In FIG. 5B, an HD pattern is shown that overcomes the limited range of lateral head displacement associated with the HD pattern in FIG. 5A. As shown in FIG. 5B, at least three frequencies are used for the HD pattern in adjacent tracks, which repeat periodically across the band where the HD pattern is written. In the embodiment of FIG. 5B, the servo reader (denoted by the block labelled R) is larger than a single track, such that at least two tones are detected under any reading conditions when the servo reader (R) is positioned over the HD pattern. The periodic waveforms are characterized by three different frequencies $f_1$, $f_2$, and $f_3$, with $f_3 > f_2 > f_1$.

In accordance with one embodiment, each waveform is characterized as having a number of periods in a range from about 25 to about 200, such as 30 periods, 50 periods, 75 periods, 100 periods, etc., within a predetermined spacing. In this embodiment, the predetermined spacing may be in a range from about 50 µm to about 150 µm, such as about 60 µm, about 75 µm, about 100 µm, etc. Moreover, the symbol length (L) may be in a range from about 0.5 µm to about 3.0 µm, such as about 1.0 µm, about 1.5 µm, about 2.0 µm, etc.

In various embodiments, the waveform at the low frequency $f_1$ may have a number of periods in a range from about 30 to about 60 within a predetermined spacing in a range from about 40 µm to about 100 µm, with a symbol length (L1) in a range from about 1200 nm to about 2100 nm.

In one embodiment, the waveform at the low frequency $f_1$ may have about 45 periods within 76 µm, with a symbol length (L1) of about 1689 nm.

In accordance with one embodiment, the waveform at frequency $f_2$ may have a number of periods in a range from about 40 to about 80 within a predetermined spacing in a range from about 40 µm to about 120 µm, with a symbol length (L2) in a range from about 900 nm to about 1600 nm.

In one embodiment, the waveform at the mid frequency $f_2$ may have about 63 periods within about 76 µm, with a symbol length (L2) of about 1206 nm.

In yet another embodiment, the waveform at frequency $f_3$ may have a number of periods in a range from about 60 to about 120 within a predetermined spacing in a range from about 40 µm to about 120 µm, with a symbol length (L3) in a range from about 500 nm to about 1100 nm.

In one embodiment, the waveform at the high frequency $f_3$ may have about 105 periods within about 76 µm, with a symbol length (L3) of about 724 nm.

Note that the waveform periods of the three frequencies are integer multiples of a period T=241.3 nm, which corresponds to the highest frequency when spectral estimation by a DFT/FFT-based detector with a minimum number of spectral bins for given integration interval is adopted.

Figure 6:
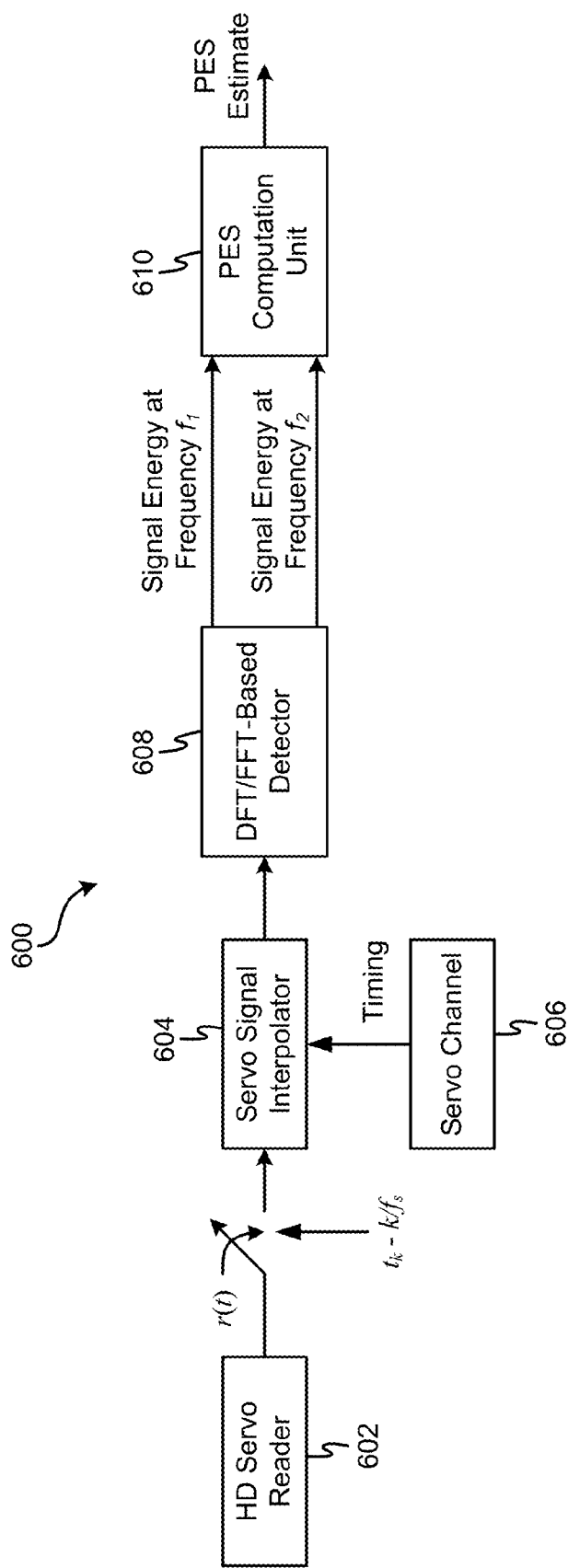
FIG. 6 shows a block diagram of a detector for HD patterns, according to the prior art.

FIG. 6 shows a block diagram of a DFT/FFT-based detector 600 configured for the computation of the PES from an HD servo pattern comprising periodic waveforms, according to the prior art. The servo signal from the servo reader 602 is interpolated using a servo signal interpolator 604 with the timing information from a synchronous servo channel 606. The interpolated signal samples are then processed by either a DFT-based or a FFT-based (DFT/FFT-based) detector 608 that estimates the signal energy values at frequencies $f_1$ and $f_2$. The DFT/FFT-based detector 608 outputs are inputted to a PES computation unit 610, which determines a PES estimate by taking the difference of the signal energy values.

Ideally, the two periodic waveforms, whose energies are estimated by the DFT/FFT-based detector 608, are sinusoidal waveforms at frequencies $f_1$ and $f_2$. However, a DFT/FFT-based detector 608 when used for HD patterns has an inherent drawback where the number of spectral components, for which an estimate of the energy is provided, depends on the integration interval for the DFT (or FFT) computation, and may be very large when the integration interval extends over several periods of the fundamental frequency, as is typically the case when a low-noise estimation process is used.

As the number of periodic waveform components forming the readback signal of an HD pattern is usually limited to two or three for a given lateral position, it is advantageous to resort to a low-complexity implementation of the detector, whereby only estimates of the energy of the relevant spectral components at two or three frequencies in the readback signal of an HD pattern are efficiently computed.

Figure 7:
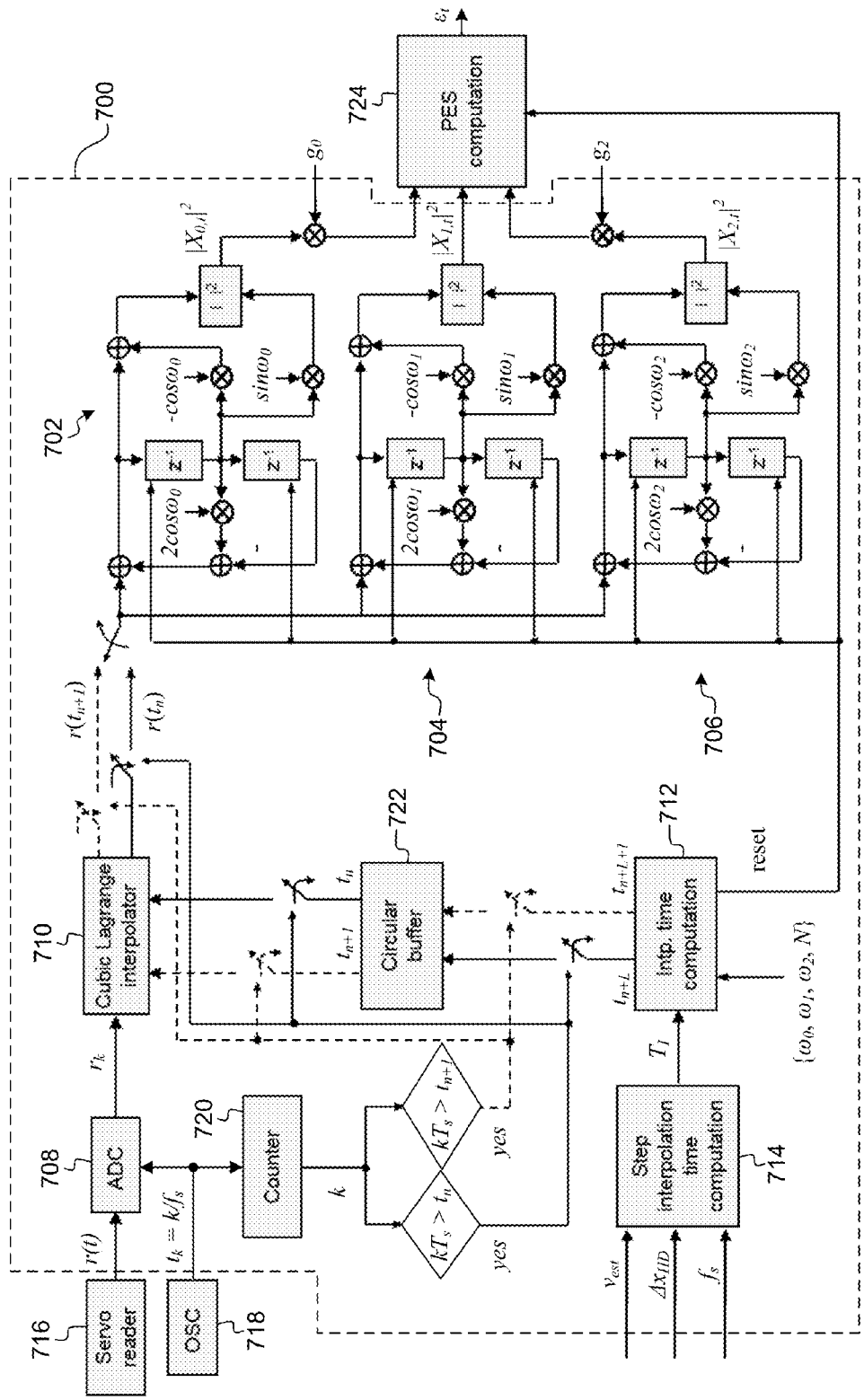
FIG. 7 shows a block diagram of a detector for HD patterns, according to one embodiment.

Now referring to FIG. 7, a detector 700 for HD patterns is shown according to one embodiment. The detector 700 is configured to operate with periodic waveforms, which represent the components of the readback signal of an HD pattern, that are characterized by at most three frequencies at any time, as illustrated for example in FIG. 5B according to one embodiment. Referring again to FIG. 7, the detector 700 includes three digital filters 702, 704, 706 with low implementation complexity, each digital filter comprising a second-order IIR stage followed by a two-tap FIR stage, for the estimation of the energy of the readback HD servo signal at a specific frequency according to the Goertzel algorithm. Other arrangements and components may be used for the three digital filters 702, 704, 706 as would be understood by one of skill in the art upon reading the present descriptions. The waveform periods (in nm) corresponding to the three frequencies may be assumed to be integer multiples of a fundamental period, T, as discussed above.

For a correct estimation of the energies of the three periodic waveform components within a finite integration interval, the frequencies of the periodic waveform components should exactly match the characteristic frequencies of the three digital filters 702, 704, 706, denoted by $\omega_0/2\pi$, $\omega_1/2\pi$, and $\omega_2/2\pi$, respectively. When an exact match is not possible, it is preferred that the frequencies are within about 0.001% to 1.0% of the frequencies set for the three digital filters 702, 704, 706, and more preferably a difference of less than about 0.1%. This is ensured by resampling the output sequence of the ADC 708 at appropriate time instants, which may be provided by an interpolator 710, with a time base obtained from the knowledge of the tape velocity and a given interpolation distance $\Delta x_{HD}$, as shown in FIG. 7. The frequency fs of the clock 718, which is used as an input to the ADC 708 and the digital circuitry of the detector 700, may be either a fixed frequency or a variable frequency.

In one embodiment, the interpolator 710 may be a cubic Lagrange interpolator to achieve smaller signal distortion than a linear interpolator. Of course, any suitable interpolator may be used, as would be understood by one of skill in the art. The output signal samples of the interpolator 710 are obtained that correspond with HD servo signal samples taken at points on the tape that are separated by a step interpolation distance equal to $\Delta x_{HD}$. $\Delta x_{HD}$ is selected such that the condition $T/\Delta x_{HD}=K$ is satisfied independently of the tape velocity, where K is a positive integer number. The time base for the generation of the interpolator output samples is provided by an interpolation time computation unit 712, which yields the sequence of time instants $\{t_n\}$, at which the resampling of the ADC output sequence takes place.

The detector 700 illustrated in FIG. 7 is configured such that at most two samples may be computed by the interpolator within a clock interval $T_s=1/f_s$. This sets a limit on the maximum tape velocity given by $2\Delta x_{HD}/T_s$. The maximum tape velocity supported by the detector 700 may be increased by allowing a larger number of samples to be computed by the interpolator 710 within a clock interval, at the expense of higher computational complexity.

For a fixed tape velocity, the time instants $\{t_n\}$ are uniformly spaced by $T_1$ seconds, where $T_1$ denotes the time interval that it takes for the tape to travel over a distance equal to the step interpolation distance $\Delta X_{HD}$. The estimation of the time interval $T_1$ is performed by a step interpolation time computation unit 714, which computes $T_1=\Delta x_{HD}/v_{est}$, i.e., the ratio between $\Delta x_{HD}$ and the estimate of the instantaneous tape velocity $v_{est}$, which may be obtained from the TBS channel in one approach. The TBS channel may operate as a synchronous TBS channel according to one embodiment. The average number of interpolated signal samples generated per ADC clock interval is given by the ratio $T_s/T_1$, where $T_s=1/f_s$ denotes the clock interval. The ADC clock frequency, $f_s$, may be a fixed frequency in one approach, or a variable frequency in another approach.

The computation of up to two interpolated samples per clock interval is provided in the HD detector 700 of FIG. 7. As mentioned above, this sets an upper limit to the maximum tape velocity, which may be calculated by $v_{max}=2\Delta x_{HD}f_s$, in one embodiment.

In one embodiment, the HD detector 700 may be configured to estimate the tape velocity to determine time instants at which to obtain interpolated signal samples to input to the Goertzel algorithm as filtering elements based on an output of a TBS channel of the tape drive configured to process a TBS pattern written on the servo band of the magnetic tape medium.

In another embodiment, the HD detector 700 may be configured to compute a head lateral position estimate for coarse positioning of the servo reader based on an output of a TBS channel of the tape drive. Also, the HD detector 700 may be configured to adjust settings for at least one digital filter according to waveform frequency components of the HD servo signal estimated based on the head lateral position estimate. For example, the setting $\omega_i$ of the i-th digital filter may be adjusted based on the coarse position estimate and the known frequency $\omega_i=2\pi f_i$ of the HD patterns located at that estimated (coarse) lateral position. In another example, the settings of the i-th digital filter may be adjusted based on the coarse position estimate and the combination of symbol length, integration interval, etc., of the HD patterns located at that estimated (coarse) lateral position.

The HD detector 700 receives, as inputs, values of the three characteristic frequencies $\{\omega_0, \omega_1, \omega_2\}$, with $\omega_i=2\pi f_i$ from which the coefficients of the digital filters 702, 704, 706 are obtained. These frequencies may be obtained from the knowledge of the servo reader lateral position provided by the TBS channel in one embodiment, as described above. The number (N) is the number of samples over which the estimates of the energies of the periodic waveforms are computed. N determines the length of the integration interval, and therefore, assuming N is even, N/2 is the number of frequencies for which energy estimates would be provided by a DFT/FFT-based HD detector that operates over N samples. N may be obtained from the tape drive memory in one embodiment.

Typically, N is about 100 or larger. Multiplication of the three energy estimates by gain factors $g_i$, for i=0,1,2, is provided to compensate for the different attenuations that the readback HD servo signal may experience at different frequencies, where the normalization $g_1=1$ is assumed. Hence, a lateral position estimate of the HD servo reader 716, and hence a position error signal from the knowledge of the target head position, may be obtained by a linear combination of the three energy estimates. Note that the maximum number of spectral estimates that are computed at any time is determined by the maximum number of tracks that may be read by the HD servo reader 716, which may equal three in some approaches, and not by the overall number of tones in the HD servo pattern, which may be larger than three. In a case where the number of tones is larger than three, the values of the three characteristic frequencies $\{\omega_0, \omega_1, \omega_2\}$ that are provided to the HD detector 700 may be derived from knowledge of the lateral position estimate obtained from the TBS channel, as mentioned above.

In another embodiment, the HD detector 700 may be implemented without an interpolator 710, but with digital filters configurable to adjust their settings according to the waveform spatial frequency components of the HD servo signal read from the magnetic tape medium and the tape velocity. Adjustment of the digital filters settings may be based on a coarse head lateral position estimate and/or a tape velocity estimate computed based on an output of a TBS channel of the tape drive.

In an alternate embodiment, an HD detector may implement additional digital filters, in excess to the digital filters used to estimate the energies at the frequencies corresponding to the patterns written on the tracks being read simultaneously by the HD servo reader 716. The one or more excess digital filters may be used to simplify reconfiguration of the detector when the target lateral position changes and, therefore, the input values of frequencies $\{\omega_x\}$ vary dynamically.

In a further embodiment, the one or more excess digital filters may be used to distinguish HD patterns characterized by a small number of spectral components/lines from broadband noise and/or data signals. This may be achieved by choosing the characteristic frequency $\omega_i$ of the excess digital filter such that it measures a spectral component at a frequency that is not used by the HD patterns.

The outputs $|X_{i,t}|^2$ from the three digital filters 702, 704, 706 are provided to a PES computation unit 724, which provides a position error estimate ($\epsilon_t$) at given time t.

Other components of the HD detector 700 may operate as would be known to one of skill in the art, and are omitted here for the sake of clarity of the described embodiments.

According to one embodiment, a system may include a processor and logic integrated with and/or executable by the processor. This logic may be configured to cause the processor to write a hybrid servo pattern to at least one dedicated area of a magnetic tape medium. As described previously, the hybrid servo pattern comprises a TBS pattern, and a HD pattern positioned at a predefined distance from the TBS pattern. In the layout of FIG. 4, the HD pattern is positioned near the TBS pattern. The HD pattern includes periodic waveforms written in at least three adjacent positions along a longitudinal direction of magnetic tape medium travel. Moreover, each of the periodic waveforms is written with a different frequency.

According to one embodiment, one waveform of the at least three periodic waveforms may be written at low frequency ($f_1$), one waveform of the at least three periodic waveforms may be written at mid frequency ($f_2$), and one waveform of the at least three periodic waveforms may be written at high frequency ($f_3$). Moreover, according to this embodiment, $f_1 < f_2 < f_3$.

In one approach, the dedicated area of the magnetic tape medium may be located on at least one outer edge of the magnetic tape medium along a longitudinal direction, as shown in more detail in FIG. 4.

Figure 8:
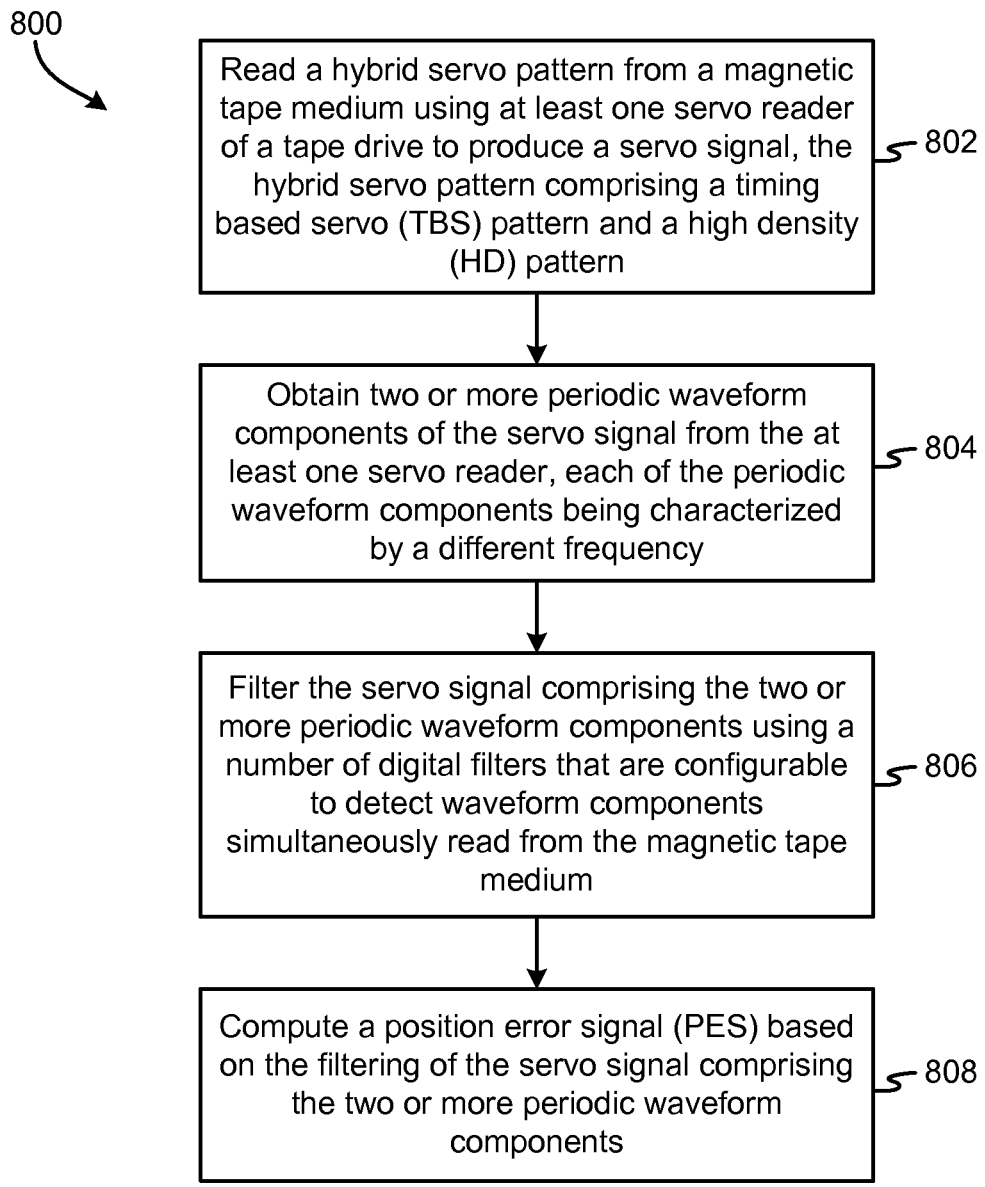
FIG. 8 shows a flowchart of a method according to one embodiment.

Now referring to FIG. 8, a flowchart of a method 800 is shown according to one embodiment. The method 800 may be performed in accordance with the present invention in any of the environments depicted in FIGS. 1-7, among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in various embodiments, the method 800 may be partially or entirely performed by a processor, a tape drive, or some other device having one or more processors therein. The processor, e.g., processing circuit(s), chip(s), and/or module(s) implemented in hardware and/or software, and preferably having at least one hardware component, may be utilized in any device to perform one or more steps of the method 800. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 8, method 800 may initiate with operation 802, where a hybrid servo pattern is read from a magnetic tape medium using at least one servo reader of a tape drive. The hybrid servo pattern comprises a TBS pattern and a HD pattern. The TBS pattern may be written adjacent to the HD pattern. The TBS pattern and HD pattern may be read from the magnetic tape medium simultaneously using a plurality of servo readers. Furthermore, the HD pattern may comprise at least three waveforms, each waveform being written at a different frequency.

In operation 804, a servo signal, such as a HD servo signal, is obtained by the superposition of two or more periodic waveform components from the servo reader, each of the periodic waveform components being characterized by a different frequency. In a preferred embodiment, the HD pattern may comprise a waveform with three frequencies, and the periodic waveform components are characterized by a low frequency ($f_1$), a mid frequency ($f_2$), and a high frequency ($f_3$). In this embodiment, $f_1 < f_2 < f_3$.

In operation 806, the servo signal comprising two or more periodic waveform components is filtered using a number of digital filters that are configurable to detect waveform components simultaneously read from the magnetic tape medium. In one embodiment, each digital filter may be characterized by a frequency of a particular periodic waveform component, e.g., each digital filter is configured to match parameters of one of the waveform components and velocity of the tape when reading the hybrid servo pattern to obtain the servo signal. The number of digital filters may be equal to or greater than a number of periodic waveform components with different frequencies read simultaneously from the magnetic tape medium.

In one example, there may be five digital filters configured to process waveforms, with the servo reader being configured to read two or three waveforms from the magnetic tape medium simultaneously.

In another example, there may be four digital filters configured to process waveforms, with the servo reader being configured to read four waveforms from the magnetic tape medium simultaneously.

In yet another example, three digital filters may be used to process three different waveform components from the servo signal, each filter being characterized by a spatial frequency of one of the waveform components and the velocity of tape.

In operation 808, a PES is computed based on the filtering of the servo signal obtained by simultaneously reading the two or more periodic waveforms in the HD pattern. In one embodiment, an estimated energy of each of the periodic waveform components of the servo signal may be output from the digital filters. Then, the PES may be computed based on the estimated energy of each of the periodic waveform components. The PES may be output and/or used by the tape drive to position the magnetic read head over a portion of the magnetic tape as indicated by the PES in order to read data from the magnetic tape, as is known in the art.

In a further embodiment, each of the estimated energies may be multiplied by a gain factor prior to computing the PES, the individual gain factors being determined in order to compensate for different attenuations that may be experienced by the readback servo signal at the different frequencies at which each waveform is stored.

The method 800, according to one embodiment, may include filtering the servo signal using a fourth digital filter characterized by a fourth frequency in response to a determination that a periodic waveform is characterized by the fourth frequency. In this way, as the servo head moves laterally across the HD pattern, and a different waveform is read from the at least three periodic waveforms initially read, a different filter is used to estimate the energy of this new periodic waveform component of the servo signal.

In one embodiment, each digital filter may include a second-order IIR stage followed by a multi-tap FIR stage configured to operate for a particular characteristic frequency. The FIR stage may preferably include two taps, or possibly three or four taps, in order to keep the processing complexity low. Each digital filter is configured to estimate an energy of a periodic waveform characterized by the particular frequency by the Goertzel algorithm, as described in more detail above. The Goertzel algorithm is well understood in the art, and may be applied using the second-order IIR stage followed by the multi-tap FIR stage.

In one embodiment, the method 800 may include estimating the tape velocity to determine time instants at which to obtain interpolated signal samples to input to the Goertzel algorithm as filtering elements based on an output of a TBS channel of the tape drive configured to process a TBS pattern written on the servo band of the magnetic tape medium.

In one approach, method 800 may include adjusting settings for at least one digital filter according to a servo reader lateral position estimated from an output of a TBS channel of the tape drive. In this way, when the digital filters are configured to be adjusted to account for changing conditions, coefficients of one of the digital filters may be adjusted to account for changes to a waveform component of the servo signal, such as different period, spacing, symbol length, etc.

Moreover, in another approach, each digital filter may be adjusted initially to be configured to estimate the energy of periodic waveform components of the type simultaneously being read from the magnetic tape medium.

In one embodiment, the low frequency waveform at $f_1$ may have a number of periods in a range from about 30 to about 60 within a predetermined spacing in a range from about 40 µm to about 100 µm, with a symbol length (L1) in a range from about 1200 nm to about 2100 nm.

Alone or in combination with this embodiment, the mid frequency waveform at $f_2$ may have a number of periods in a range from about 40 to about 80 within a predetermined spacing in a range from about 40 µm to about 120 µm, with a symbol length (L2) in a range from about 900 nm to about 1600 nm.

Additionally, alone or in combination with the values for either of the two frequencies described above, the high frequency waveform at $f_3$ may have a number of periods in a range from about 60 to about 120 within a predetermined spacing in a range from about 40 µm to about 120 µm, with a symbol length (L3) in a range from about 500 nm to about 1100 nm.

In one specific embodiment, the low frequency waveform may have about 45 periods within 76 µm, with the L1 of about 1689 nm, the mid frequency waveform may have about 63 periods within about 76 µm, with the L2 of about 1206 nm, and the high frequency waveform may have about 105 periods within about 76 µm, with the L3 of about 724 nm.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an ASIC, a FPGA, etc. By executable by the processor, what is meant is that the logic is hardware logic, software logic such as firmware, part of an operating system, part of an application program, etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a CPU, an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A tape drive, comprising:
a controller comprising a processor and logic integrated with and/or executable by the processor, the logic being configured to:
obtain at least two periodic waveform components of a high density (HD) servo signal read by a servo reader from a HD pattern written on a servo band of a magnetic tape medium, each of the at least two periodic waveform components being characterized by a different frequency;
filter the HD servo signal using a number of digital filters that are configurable to detect waveform components simultaneously read from the magnetic tape medium, each digital filter being configured to match waveform component parameters and tape velocity; and
compute a position error signal (PES) based on the filtering of the HD servo signal comprising the waveform components.

2. The tape drive as recited in claim 1, wherein three periodic waveform components are obtained, which are characterized by a low frequency ($f_1$), a mid frequency ($f_2$), and a high frequency ($f_3$), wherein $f_1 < f_2 < f_3$.

3. The tape drive as recited in claim 2, wherein the logic is further configured to filter one of the periodic waveform components using a fourth digital filter characterized by a fourth frequency in response to a determination that a periodic waveform component is characterized by the fourth frequency.

4. The tape drive as recited in claim 2, wherein the low frequency waveform at $f_1$ has a number of periods in a range from about 30 to about 60 within a predetermined spacing in a range from about 40 μm to about 100 μm, with a symbol length (L1) in a range from about 1200 nm to about 2100 nm, wherein the mid frequency waveform at $f_2$ has a number of periods in a range from about 40 to about 80 within a predetermined spacing in a range from about 40 μm to about 120 μm, with a symbol length (L2) in a range from about 900 nm to about 1600 nm, and wherein the high frequency waveform at $f_3$ has a number of periods in a range from about 60 to about 120 within a predetermined spacing in a range from about 40 μm to about 120 μm, with a symbol length (L3) in a range from about 500 nm to about 1100 nm.

5. The tape drive as recited in claim 4, wherein a first digital filter is configured to estimate an energy of the low frequency waveform having about 45 periods within 76 μm, with the L1 of about 1689 nm, wherein a second digital filter is configured to estimate an energy of the mid frequency waveform having about 63 periods within about 76 μm, with the L2 of about 1206 nm, and wherein a third digital filter is configured to estimate an energy of the high frequency waveform having about 105 periods within about 76 µm, with the L3 of about 724 nm.

6. The tape drive as recited in claim 1, wherein the logic is further configured to output an estimated energy of each of the periodic waveform components of the HD pattern using the digital filters, wherein the PES is computed based on the estimated energy of each of the periodic waveform components.

7. The tape drive as recited in claim 1, wherein each digital filter comprises a second-order infinite impulse response (IIR) stage followed by a multi-tap finite impulse response (FIR) stage configured to operate for a particular frequency, each digital filter being configured to estimate an energy of a periodic waveform component characterized by the particular frequency by the Goertzel algorithm.

8. The tape drive as recited in claim 7, wherein the logic is further configured to estimate the tape velocity to determine time instants at which to obtain interpolated signal samples to input to the Goertzel algorithm as filtering elements based on an output of a timing based servo (TBS) channel of the tape drive configured to process a TBS pattern written on the servo band of the magnetic tape medium.

9. The tape drive as recited in claim 1, wherein the logic is further configured to:
compute a head lateral position estimate for coarse positioning of the servo reader based on an output of a timing based servo (TBS) channel of the tape drive configured to process a TBS pattern written on the servo band of the magnetic tape medium; and
adjust settings for at least one digital filter according to waveform frequency components of the HD servo signal estimated based on the head lateral position estimate.

10. A method, comprising:
reading a hybrid servo pattern from a magnetic tape medium using at least one servo reader of a tape drive to produce a servo signal, the hybrid servo pattern comprising a timing based servo (TBS) pattern and a high density (HD) pattern;
obtaining two or more periodic waveform components of the servo signal from the at least one servo reader, each of the periodic waveform components being characterized by a different frequency: a low frequency ($f_1$), a mid frequency ($f_2$), and a high frequency ($f_3$), wherein $f_1<f_2<f_3$;
filtering the servo signal using a number of digital filters equal to or greater than a number of periodic waveform components simultaneously read from the magnetic tape medium, each digital filter being configurable to match a frequency of a particular periodic waveform component and a tape velocity; and
computing a position error signal (PES) based on the filtering of the servo signal comprising the periodic waveform components.

11. The method as recited in claim 10, further comprising filtering the servo signal using a fourth digital filter characterized by a fourth frequency in response to a determination that a periodic waveform component is characterized by the fourth frequency.

12. The method as recited in claim 10, further comprising outputting an estimated energy of each of the periodic waveform components of the HD pattern using the digital filters, wherein the PES is computed based on the estimated energy of each of the periodic waveform components.

13. The method as recited in claim 10, wherein each digital filter comprises a second-order infinite impulse response (IIR) stage followed by a multi-tap finite impulse response (FIR) stage configured to operate for a particular frequency, each digital filter being configured to estimate an energy of a periodic waveform component characterized by the particular frequency by the Goertzel algorithm.

14. The method as recited in claim 13, further comprising estimating a tape velocity to determine time instants at which to obtain interpolated signal samples to input to the Goertzel algorithm as filtering elements based on an output of a TBS channel of the tape drive configured to process the TBS pattern written on a servo band of the magnetic tape medium.

15. The method as recited in claim 10, further comprising:
computing a head lateral position estimate for coarse positioning of the at least one servo reader based on an output of a TBS channel of the tape drive configured to process the TBS pattern written on a servo band of the magnetic tape medium; and
adjust settings for at least one digital filter according to waveform frequency components of the servo signal estimated based on the head lateral position estimate.

16. The method as recited in claim 10, wherein the low frequency waveform at $f_1$ has a number of periods in a range from about 30 to about 60 within a predetermined spacing in a range from about 40 µm to about 100 µm, with a symbol length (L1) in a range from about 1200 nm to about 2100 nm, wherein the mid frequency waveform at $f_2$ has a number of periods in a range from about 40 to about 80 within a predetermined spacing in a range from about 40 µm to about 120 µm, with a symbol length (L2) in a range from about 900 nm to about 1600 nm, and wherein the high frequency waveform at $f_3$ has a number of periods in a range from about 60 to about 120 within a predetermined spacing in a range from about 40 µm to about 120 µm, with a symbol length (L3) in a range from about 500 nm to about 1100 nm.

17. The method as recited in claim 10, wherein each digital filter comprises a second-order infinite impulse response (IIR) stage followed by a multi-tap finite impulse response (FIR) stage configured to operate for a particular frequency, each digital filter being configured to estimate an energy of a periodic waveform component characterized by the particular frequency by the Goertzel algorithm, and wherein the method further comprises estimating a tape velocity to determine time instants at which to obtain interpolated signal samples to input to the Goertzel algorithm as filtering elements based on an output of a TBS channel of the tape drive configured to process the TBS pattern written on a servo band of the magnetic tape medium.

18. A system, comprising a processor and logic integrated with and/or executable by the processor, the logic being configured to cause the processor to:
read a hybrid servo pattern from at least one dedicated area of a magnetic tape medium to obtain a servo signal; and
filter the servo signal using a number of digital filters equal to or greater than a number of periodic waveform components simultaneously read from the magnetic tape medium, each digital filter being configurable to match a frequency of a particular periodic waveform component and a tape velocity,
wherein the hybrid servo pattern comprises:
a timing based servo (TBS) pattern; and
a high density (HD) pattern positioned at a predefined distance from the TBS pattern, the HD pattern comprising:
periodic waveforms written in at least three adjacent positions along a longitudinal direction of magnetic tape medium travel, each of the periodic waveforms being written with a different frequency.

19. The system as recited in claim 18, wherein one waveform of the at least three periodic waveforms is written at low frequency ($f_1$), wherein one waveform of the at least three periodic waveforms is written at mid frequency ($f_2$), and wherein one waveform of the at least three periodic waveforms is written at high frequency ($f_3$), and wherein $f_1<f_2<f_3$, wherein the low frequency waveform at $f_1$ has a number of periods in a range from about 30 to about 60 within a predetermined spacing in a range from about 40 μm to about 100 μm, with a symbol length (L1) in a range from about 1200 nm to about 2100 nm, wherein the mid frequency waveform at $f_2$ has a number of periods in a range from about 40 to about 80 within a predetermined spacing in a range from about 40 μm to about 120 μm, with a symbol length (L2) in a range from about 900 nm to about 1600 nm, and wherein the high frequency waveform at $f_3$ has a number of periods in a range from about 60 to about 120 within a predetermined spacing in a range from about 40 μm to about 120 μm, with a symbol length (L3) in a range from about 500 nm to about 1100 nm.

20. The system as recited in claim 18, wherein each digital filter comprises a second-order infinite impulse response (IIR) stage followed by a multi-tap finite impulse response (FIR) stage configured to operate for a particular frequency, each digital filter being configured to estimate an energy of a periodic waveform component characterized by the particular frequency by the Goertzel algorithm, and wherein the logic is further configured to cause the processor to estimate a tape velocity to determine time instants at which to obtain interpolated signal samples to input to the Goertzel algorithm as filtering elements based on an output of a TBS channel configured to process the TBS pattern written on a servo band of the magnetic tape medium.

21. A tape drive, comprising:
a controller comprising a processor and logic integrated with and/or executable by the processor, the logic being configured to:
obtain at least three periodic waveform components of a high density (HD) servo signal read by a servo reader from a HD pattern written on a servo band of a magnetic tape medium;
filter the HD servo signal using a number of digital filters to detect the at least three waveform components read from the magnetic tape medium, each digital filter being configured to match tape velocity and waveform component parameters of a single waveform component, wherein the number of digital filters is equal to or greater than a number of waveform components read from the magnetic tape medium; and
compute a position error signal (PES) based on the filtering of the HD servo signal comprising the waveform components.

22. The tape drive as recited in claim 21, wherein the logic is further configured to output an estimated energy of each of the periodic waveform components of the HD pattern using the digital filters, wherein the PES is computed based on the estimated energy of each of the periodic waveform components.

23. The tape drive as recited in claim 21, wherein each digital filter comprises a second-order infinite impulse response (IIR) stage followed by a multi-tap finite impulse response (FIR) stage configured to operate for a particular frequency, each digital filter being configured to estimate an energy of a periodic waveform component characterized by the particular frequency by the Goertzel algorithm.

24. A computer program product, comprising a computer readable storage medium having program instructions embodied therewith, wherein the computer readable storage medium is not a transitory signal per se, the program instructions readable by a tape drive to cause the tape drive to perform a method comprising:
reading, by the tape drive, a hybrid servo pattern from a magnetic tape medium using at least one servo reader of the tape drive to produce a servo signal, the hybrid servo pattern comprising a timing based servo (TBS) pattern and a high density (HD) pattern;
obtaining, by the tape drive, two or more periodic waveform components of the servo signal from the at least one servo reader, each of the periodic waveform components being characterized by a different frequency: a low frequency ($f_1$), a mid frequency ($f_2$), and a high frequency ($f_3$), wherein $f_1<f_2<f_3$;
filtering, by the tape drive, the servo signal using a number of digital filters equal to or greater than a number of periodic waveform components simultaneously read from the magnetic tape medium, each digital filter being characterized by a frequency of a particular periodic waveform component and a tape velocity; and
computing, by the tape drive, a position error signal (PES) based on the filtering of the servo signal comprising the periodic waveform components.

25. The computer program product as recited in claim 24, wherein each digital filter comprises a second-order infinite impulse response (IIR) stage followed by a multi-tap finite impulse response (FIR) stage configured to operate for a particular frequency, each digital filter being configured to estimate an energy of a periodic waveform component characterized by the particular frequency by the Goertzel algorithm.

* * * * *